United States Patent
Rouquette-Leveil et al.

(10) Patent No.: US 8,223,624 B2
(45) Date of Patent: Jul. 17, 2012

(54) METHOD AND APPARATUS FOR TRANSMITTING AND RECEIVING A DATA SYMBOL STREAM

(75) Inventors: Stephanie Rouquette-Leveil, Massy (FR); Marc Bernard De Courville, Paris (FR); Alexandre Ribeiro Dias, Toulouse (FR); Sebastien Simoens, Sceaux (FR)

(73) Assignee: Motorola Mobility, Inc., Libertyville, IL (US)

( * ) Notice: Subject to any disclaimer, the term of this patent is extended or adjusted under 35 U.S.C. 154(b) by 1277 days.

(21) Appl. No.: 11/571,586

(22) PCT Filed: Jul. 7, 2005

(86) PCT No.: PCT/US2005/024332
§ 371 (c)(1),
(2), (4) Date: Oct. 18, 2007

(87) PCT Pub. No.: WO2006/010030
PCT Pub. Date: Jan. 26, 2006

(65) Prior Publication Data
US 2011/0134904 A1 Jun. 9, 2011

(30) Foreign Application Priority Data
Jul. 8, 2004 (EP) .................................... 04291794

(51) Int. Cl.
*H04J 11/00* (2006.01)
(52) U.S. Cl. ........................................ 370/208; 375/260
(58) Field of Classification Search .......... 370/320–327, 370/342, 441, 347–350, 208–209, 334–338; 375/295, 260–267
See application file for complete search history.

(56) References Cited

U.S. PATENT DOCUMENTS

| | | | |
|---|---|---|---|
| 6,212,654 B1 * | 4/2001 | Lou et al. ....................... | 714/701 |
| 7,095,731 B2 | 8/2006 | Kim et al. | |
| 2002/0085643 A1 * | 7/2002 | Kitchener et al. ............ | 375/267 |
| 2002/0172293 A1 | 11/2002 | Kuchi et al. | |
| 2003/0086479 A1 * | 5/2003 | Naguib ......................... | 375/144 |
| 2003/0161412 A1 | 8/2003 | Niida et al. | |
| 2003/0218973 A1 | 11/2003 | Oprea et al. | |
| 2005/0078761 A1 * | 4/2005 | Hottinen et al. .............. | 375/267 |
| 2007/0183527 A1 * | 8/2007 | Jia et al. ........................ | 375/267 |

OTHER PUBLICATIONS

Chinese Examiner, "Notification of the Second Office Action," The State Intellectual Property Office of the Peoples Republic of China, Beijing, China, Jun. 23, 2010, 10 pages, most relevant pp. 1-5.
Taiwan, Office Action of the IPO (Translation), Jun. 30, 2011, all pages.

* cited by examiner

*Primary Examiner* — Pao Sinkantarakorn
*Assistant Examiner* — Iqbal Zaidi (57) ABSTRACT

A transmitter comprises a block generator (109) which divides a data symbol stream into data symbol blocks. A divide processor (111) divides each block into a first set of data symbols stored in a first set buffer (113) and a second set of data symbols stored in a second set buffer (115). A space time block encoder (117) codes the first set in accordance with a space time block code to generate a coded set of data symbols. A parallel processor (119) then creates a plurality of parallel data streams from the coded set and the second set. Each of the parallel data streams is allocated to one of a plurality of antennas (129-135). A plurality of parallel stream transmitters (121-127) transmits the parallel data streams in parallel in a communication channel from the plurality of transmit antennas (129-135).

19 Claims, 1 Drawing Sheet

METHOD AND APPARATUS FOR TRANSMITTING AND RECEIVING A DATA SYMBOL STREAM

FIELD OF THE INVENTION

The invention relates to a method and apparatus for transmitting and receiving a data symbol stream and in particular to communication of a data stream over a radio communication channel using parallel transmissions from a plurality of antennas.

BACKGROUND OF THE INVENTION

In recent years, the popularity of systems using wireless radio communication has increased substantially. For example, cellular communication systems and wireless networks have now become commonplace. The increased requirement for frequency spectrum resource has led to an increased desire for efficient communication and especially at higher frequencies and for higher data rates.

For example, Wireless Local Area Networks WLANs are becoming common not only in business environments but also in domestic environments. In order to increase the capacity of such WLANs, it is desirable to increase the data rate of the wireless communication. As a specific example, the Institute of Electrical and Electronic Engineers (IEEE) have formed a committee for standardising a high-speed WLAN standard known as IEEE 802.11n(TradeMark). The 802.11n™ standard comprises Wireless LAN Medium Access Control (MAC) and Physical Layer (PHY) Specifications aimed at enhancing WLANs to provide higher effective data throughputs. It is intended that the 802.11n™ standard will help WLANs meet the expanding bandwidth needs of enterprise and home networks, as well as those of WLAN hot spots.

In order to achieve high data rates over the air interface, a number of advanced radio techniques are employed. It has been found that in systems using open-loop approaches (i.e. without the transmitter using knowledge of the transmit channel or the signal received at the receiver) significant improvement can be achieved by using multiple antennas at the transmitter and the receiver. In particular, many radio communication systems such as WLANs provide for a plurality of transmit and receive antennas to be used. Specifically, some transmission techniques involve transmitting a data stream by simultaneously transmitting different signals derived from the data stream from different antennas over the same communication channel. The receiver(s) of these techniques typically also comprise a plurality of antennas each of which receive a combined signal corresponding to the transmitted signals modified by the individual propagation characteristics of the radio link between the individual antennas. The receiver may then retrieve the transmitted data stream by evaluating the received combined signal.

Such techniques are known as Multiple Transmit Multiple Receive (MTMR) schemes and can be designed to derive benefit from spatial diversity between the antennas in order to improve the detection. Indeed, the equivalent Signal to Noise Ratio (SNR) of the combined signal is typically increased compared to the single antenna case thereby allowing higher channel symbol rates or higher order constellations. This may increase the data rate for the communication link and thus the capacity of the communication system.

For the situation where two transmit antennas are used, an efficient transmit case has been proposed in "A simple transmit diversity technique for wireless communications," by S. M. Alamouti IEEE Journal on Selected Areas in Comm., pp. 1451-1458, October 1998. The proposed technique is known as Alamouti coding and comprises transmitting two symbols from two antennas during two symbol times such that the original symbols may easily be derived by a receiver. The proposed technique is a specific case of Space-Time Block Coding (STBC) and results in high performance for two transmit antennas by providing for orthogonal transmission of the two symbols while fully exploiting the spatial diversity of the two antennas.

However, it is not possible to directly extend the Alamouti coding technique to more than two transmit antennas while providing full orthogonality and fully exploiting the antenna diversity. Accordingly, the performance improvement achieved from adding additional transmit antennas reduce for increasing antenna numbers for STBC techniques. Furthermore, it has been demonstrated that such approaches are sub-optimal from a capacity point of view when the receiver has two or more antennas. Accordingly, STBC techniques are very suitable for systems wherein relatively small numbers of transmit and receive antennas are used but are less suitable for systems using a larger number of antennas.

Other transmit schemes used for multiple transmit antennas consist in simultaneously transmitting different data streams from different antennas to increase the spectral efficiency of the system. For example, a single data stream may be split into two sub-data streams that are then individually and simultaneously transmitted over the same communication channel from different antennas. In these spatial division multiplexing techniques, the receiver evaluates the combined signals received from the transmit antennas and jointly determines the transmitted symbols.

Theoretically, a maximum likelihood approach can be used wherein the data symbols of the different data streams are selected as the data symbols which for the estimated sub-communication channel characteristics most probably would result in the received combined signal. However, such a technique is computationally demanding and is impractical for most systems. Accordingly, other receive techniques including Zero-Forcing and Minimum Mean Square Error (MMSE) techniques are typically used, potentially combined with iterative detection techniques. However, these techniques rely on there being a large number of decorrelated received signal samples available thereby requiring a large number of receive antennas. Thus, such techniques suffer from relatively poor performance in view of the high decoding complexity, and in particular in cases where identical number of transmit and receive antennas are used.

An example of a transmit technique for multiple transmit antennas have been proposed in "Double-STTD scheme for HSDPA systems with four transmit antennas: Link Level Simulation Results" by Texas Instruments presented to the 3rd Generation Partnership Project (3GPP) in TSG-R WG1 document, TSGR1#20(01)0458, 21-24 May, 2001, Busan, Korea.

In this technique, data is transmitted over four transmit antennas by individually Alamouti coding two data streams and simultaneously transmitting each of the resulting data streams over two of the antennas. Hence, two data streams are transmitted simultaneously from 4 antennas, each stream being encoded using the Alamouti code. However, although improved performance may be achieved over a classical four antenna space division multiplexing scheme, the resulting data rate is significantly reduced due to the symbol doubling associated with the Alamouti code.

Hence, an improved wireless communication technique using multiple transmit antennas and preferably multiple receive antennas would be advantageous and in particular a technique allowing for improved performance and/or reduced complexity would be advantageous.

SUMMARY OF THE INVENTION

Accordingly, the Invention seeks to preferably mitigate, alleviate or eliminate one or more of the above-mentioned disadvantages singly or in any combination.

According to a first aspect of the invention there is provided an apparatus for transmitting a data symbol stream over a communication channel, the apparatus comprising: a plurality of transmit antennas; means for dividing the data symbol stream into data symbol blocks; means for dividing each of the data symbol blocks into a first set of data symbols and a second set of data symbols, means for coding the first set in accordance with a space time block code to generate a coded set of data symbols; means for creating a plurality of parallel data streams from the coded set and the second set, each parallel data stream being allocated to one of the plurality of antennas; and means for transmitting the data symbol blocks in the communication channel by transmitting the parallel data streams in parallel from the plurality of transmit antennas.

The invention may provide improved communication of a data stream using a plurality of antennas. In particular higher data rates and/or reduced transmit powers may be achieved for a given error rate. The invention may additionally or alternatively provide a system suitable for practical implementation and may typically allow low complexity transmitter and receiver operation.

In particular, by spatially multiplexing data which has been coded according to a space time block code and data which has not been coded according to a space time block code, the relative advantages of space time block coding and spatial diversity multiplexing may be flexibly exploited. For example, a more flexible data rate can be selected and this data rate may be higher than for conventionally space time block coded data. At the same time, the performance of space time block codes may be exploited and in particular a system transmitting a signal that may be effectively decoded by a receiver comprising relatively few antennas is enabled or facilitated.

The parallel data streams are transmitted over the same communication channel. Hence, the same communication channel is shared by the parallel transmissions which therefore typically interfere with each other resulting in a receiver receiving a combined signal comprising contributions from the signals of each transmit antenna modified by the characteristics of the individual sub-communication channel associated with the individual transmit antenna and receive antenna. A communication channel may consist in a frequency, time and possibly code allocation. Thus, each transmission of the parallel data stream may use the same frequency and possibly code while transmitting in the same time interval. A data stream comprises two or more data symbols.

Optionally, the plurality of transmit antennas are spatially located such that the sub-communication channel characteristics between the plurality of transmit antennas and a given receive channel are significantly de-correlated. Hence, the use of a plurality of transmit antennas may provide spatial diversity.

According to an optional feature of the invention, the means for creating the plurality of parallel data streams is operable to divide the data symbols of the coded set and the second set into a plurality of parallel data symbols, each parallel data symbol comprising one data symbol for each parallel data stream. The parallel data symbols may correspond to a single composite symbol transmitted over the communication channel from the transmitter to a receiver. The parallel data symbols may be transmitted in a single symbol time such that in each symbol time interval a single parallel data symbol is transmitted from the transmitter using the plurality of transmit antennas.

According to an optional feature of the invention, the apparatus further comprises means for varying the association between the parallel data streams and the coded set and the second set for different parallel data symbols.

For example spatial interleaving may be introduced such that the space time block coded data is switched between the plurality of transmit antennas and the non-space time block coded data symbols are switched between the plurality of transmit antennas. The coded set may thus experience varying communication sub-channels corresponding to the different antennas. Similarly, the second set may experience varying communication sub-channels corresponding to the different antennas. This may significantly improve performance and may provide for a better utilisation of the spatial diversity between the plurality of transmit antennas.

According to an optional feature of the invention, the means for varying is operable to vary a first parallel data stream from being associated with the coded set in a first parallel data symbol to being associated with the second set in a second parallel data symbol. A given transmit antenna may transmit both space time block coded data and non space time block coded data in different symbol times. This may improve performance and facilitate reception of the transmitted signal in some embodiments.

According to an optional feature of the invention, at least one parallel data symbol comprises only data symbols from the coded set. This may improve performance and facilitate reception of the transmitted signal in some embodiments.

According to an optional feature of the invention, at least one parallel data symbol comprises data symbols from both the coded set and the second set. This may improve performance and facilitate reception of the transmitted signal in some embodiments.

According to an optional feature of the invention, each of the parallel data symbols is created by selecting a first number of data symbols from the coded set and a second number of data symbols from the second set. The first number may be equal to the second number. This may improve performance and facilitate implementation in some embodiments.

According to an optional feature of the invention, consecutive parallel data symbols within the data symbol block each comprise at least one data symbol resulting from space time block coding of a common data symbol. A space time block coding of a data symbol may result in a plurality of coded data symbols of which a first coded data symbol is comprised in a first parallel data symbol and a second coded data symbol is comprised in a parallel data symbol following the first parallel data symbol. This may improve correlation between consecutive parallel data symbols thereby facilitating or enabling joint detection and improving performance.

According to an optional feature of the invention, each data symbol block contains eight data symbols, the first set contains four data symbols, the coded set contains eight data symbols, the second set contains four data symbols and the plurality of antennas is four antennas. The coded set in this case comprises eight space time block coded data symbols of which some may be substantially identical to some of the data symbols of the first set. The feature may provide for a particularly advantageous and high performance implementation for transmit systems using four transmit antennas.

According to an optional feature of the invention, the data coding blocks comprise eight data symbols $S_1, S_2, S_3, S_4, S_5, S_6, S_7, S_8$ and the parallel data streams comprise the data symbols substantially given by:

$$\begin{vmatrix} S_7 & -S_2^* & S_1 \\ S_8 & S_1^* & S_2 \\ S_3 & -S_4^* & S_5 \\ S_4 & S_3^* & S_6 \end{vmatrix}$$

wherein each row represents a parallel data stream associated with one antenna and each column represents a transmit symbol time and * denotes complex conjugation. This may provide for a desirable performance in some embodiments using four transmit antennas. The eight data symbols may be received in any order in the data symbol blocks.

According to an optional feature of the invention, each data symbol block contains four data symbols, the first set contains two data symbols, the coded set contains four data symbols, the second set contains two data symbols and the plurality of antennas is three antennas. The coded set in this case comprises four space time block coded data symbols of which some may be substantially identical to some of the data symbols of the first set. The feature may provide for a particularly advantageous and high performance implementation for transmit systems using three antennas.

According to an optional feature of the invention, the data coding blocks comprise four data symbols $S_1, S_2, S_3, S_4$, and the parallel data streams comprise the data symbols substantially given by:

$$\begin{vmatrix} -S_2^* & S_1 \\ S_1^* & S_2 \\ S_4^* & S_3 \end{vmatrix}$$

wherein each row represents a parallel data stream associated with one antenna and each column represents a transmit symbol time and * denotes complex conjugation. This may provide for a desirable performance in some embodiments using three transmit antennas. The four data symbols may be received in any order in the data symbol blocks.

According to an optional feature of the invention, the apparatus further comprises: means for applying a forward error correcting code to a data stream to generate a first encoded data stream; and means for generating the data symbol stream by mapping the first coded data stream to a data symbol constellation. This may provide a practical implementation and may improve performance. In particular, the synergy between the forward error correcting code, the partial space time block coding and the spatial diversity provided by the plurality of antennas may improve performance.

According to an optional feature of the invention, the apparatus further comprises: means for applying a first forward error correcting code to a first data stream to generate a first encoded data stream; means for applying a second forward error correcting code to a second data stream to generate a second encoded data stream; and means for generating the data symbol stream by including the first coded data stream and the second coded data stream. This may provide a practical implementation and may improve performance.

According to an optional feature of the invention, the first set comprises both data symbols corresponding to the first encoded data stream and data symbols corresponding to the second encoded data stream. Additionally or alternatively, the second set comprises both data symbols corresponding to the first encoded data stream and data symbols corresponding to the second encoded data stream. This may improve performance. In particular, the synergy between the use of different forward error correcting codes, the partial space time block coding and the spatial diversity provided by the plurality of antennas may improve performance.

According to an optional feature of the invention, the apparatus further comprises means for interleaving the first encoded data stream. The apparatus may additionally or alternatively comprise mean for interleaving the second encoded data stream. This may improve performance. In particular, the synergy between the interleaving, the forward error correcting code, the partial space time block coding and the spatial diversity provided by the plurality of antennas may improve performance. The interleaving may for example be a time domain bit interleaving.

According to an optional feature of the invention, the means for dividing each of the data symbol blocks into the first set is operable to divide the data symbols of a data symbol block into the first and the second set in accordance with a varying criterion. A different criterion may be used for different data blocks. For example, each data symbol block may comprise a data stream of ordered data and the data symbols which are selected for the first set and the second set may be changed from one block to the next. The number of data symbols included in the first set and the second set may in some embodiments vary whereas in other embodiments the selection simply chooses different data symbols. The feature may provide improved performance. In particular, improved performance may be achieved through improved de-correlation in embodiments wherein the ordered data symbols of one block are correlated with the ordered data symbols of another block.

According to an optional feature of the invention, a number of data symbols in the first set is equal to a number of data symbols in the second set. This may provide a suitable implementation and performance in some embodiments.

According to an optional feature of the invention, the space time block code is an Alamouti code. This may provide a particularly advantageous implementation with high performance. In particular, the Alamouti code may provide a high degree of orthogonality and benefit from spatial diversity.

According to an optional feature of the invention, data symbols of the parallel transmissions are substantially time aligned. This provides for facilitated transmit and receive operations.

According to an optional feature of the invention, the apparatus further comprises: receiving means for receiving the transmitted data symbol blocks; and means for, for each data symbol block, determining the block data symbols by joint detection of the parallel data streams. This provides a practical implementation of receiving means suitable for receiving the transmissions from the plurality of antennas. The apparatus may be a distributed apparatus wherein the plurality of transmit antennas are located at a distance from the receiving means.

According to an optional feature of the invention, the receiving means is operable to determine an equivalent channel matrix for each receive antenna and to determine the block data symbols in response to the equivalent channel matrix and the received data symbols. The equivalent channel matrix reflects an estimated correspondence between the data symbols of the data symbol block and the received signal at each receive antenna in each transmit data symbol time. The equivalent channel matrix may comprise a zero for each receive antenna in positions corresponding to a data symbol and a symbol time in which the data symbol is not transmitted. The equivalent channel matrix may comprise a sub-channel estimate for each receive antenna in positions corresponding to a data symbol and a symbol time in which the data symbol is transmitted. The sub-channel estimate may be a sub-channel estimate associated with the transmit antenna on which the data symbol was transmitted and the receive antenna of the received signal. This may provide a suitable receive operation having suitable performance and complexity.

According to an optional feature of the invention, the means for creating a plurality of parallel data streams is operable to allocate data symbols of the first set and the coded data set to the parallel data streams such that a rank of the equivalent channel matrix is higher than or equal to a number of data symbols in the data symbol blocks. This may provide for improved receive performance and may in particular allow a received signal from which the data symbols of the data symbol blocks can be derived using practical joint detection techniques.

According to an optional feature of the invention, the receiving means comprises fewer receive antennas than the plurality of transmit antennas. The invention may allow an efficient system of wireless communication wherein the number of receive antennas may be reduced thereby reducing cost.

According to a second aspect of the invention, there is provided an apparatus for receiving a data symbol stream; the apparatus comprising: means for receiving a signal over a communication channel, the signal comprising a plurality of data symbol blocks, each data symbol block comprising a plurality of parallel data streams, each parallel data stream being transmitted from a separate antenna, the parallel data streams comprising space time block coded data symbols and non space time block coded data symbols; and means for generating the data symbol stream by joint detection of the parallel data streams.

According to a third aspect of the invention, there is provided a communication system comprising an apparatus as described above.

According to a fourth aspect of the invention, there is provided a method of transmitting a data symbol stream over a communication channel from a plurality of transmit antennas; the method comprising the steps of: dividing the data symbol stream into data symbol blocks; dividing each of the data symbol blocks into a first set of data symbols and a second set of data symbols, coding the first set in accordance with a space time block code to generate a coded set of data symbols; creating a plurality of parallel data streams from the coded set and the second set, each parallel data stream being allocated to one of the plurality of antennas; and transmitting the data symbol blocks in the communication channel by transmitting the parallel data streams in parallel from the plurality of transmit antennas.

According to a fifth aspect of the invention, there is provided a method of receiving a data symbol stream; the method comprising the steps of: a signal over a communication channel, the signal comprising a plurality of data symbol blocks, each data symbol block comprising a plurality of parallel data streams, each parallel data stream being transmitted from a separate antenna, the parallel data streams comprising space time block coded data symbols and non space time block coded data symbols; and generating the data symbol stream by joint detection of the parallel data streams.

These and other aspects, features and advantages of the invention will be apparent from and elucidated with reference to the embodiment(s) described hereinafter.

BRIEF DESCRIPTION OF THE DRAWINGS

An embodiment of the invention will be described, by way of example only, with reference to the drawings, in which.

DETAILED DESCRIPTION OF A PREFERRED EMBODIMENT OF THE INVENTION

The following description focuses on an embodiment of the invention wherein an Alamouti code is applied. However, it will be appreciated that the invention is not limited to this specific code but that other space time block codes may be used in other embodiments.

Figures 1, 2:
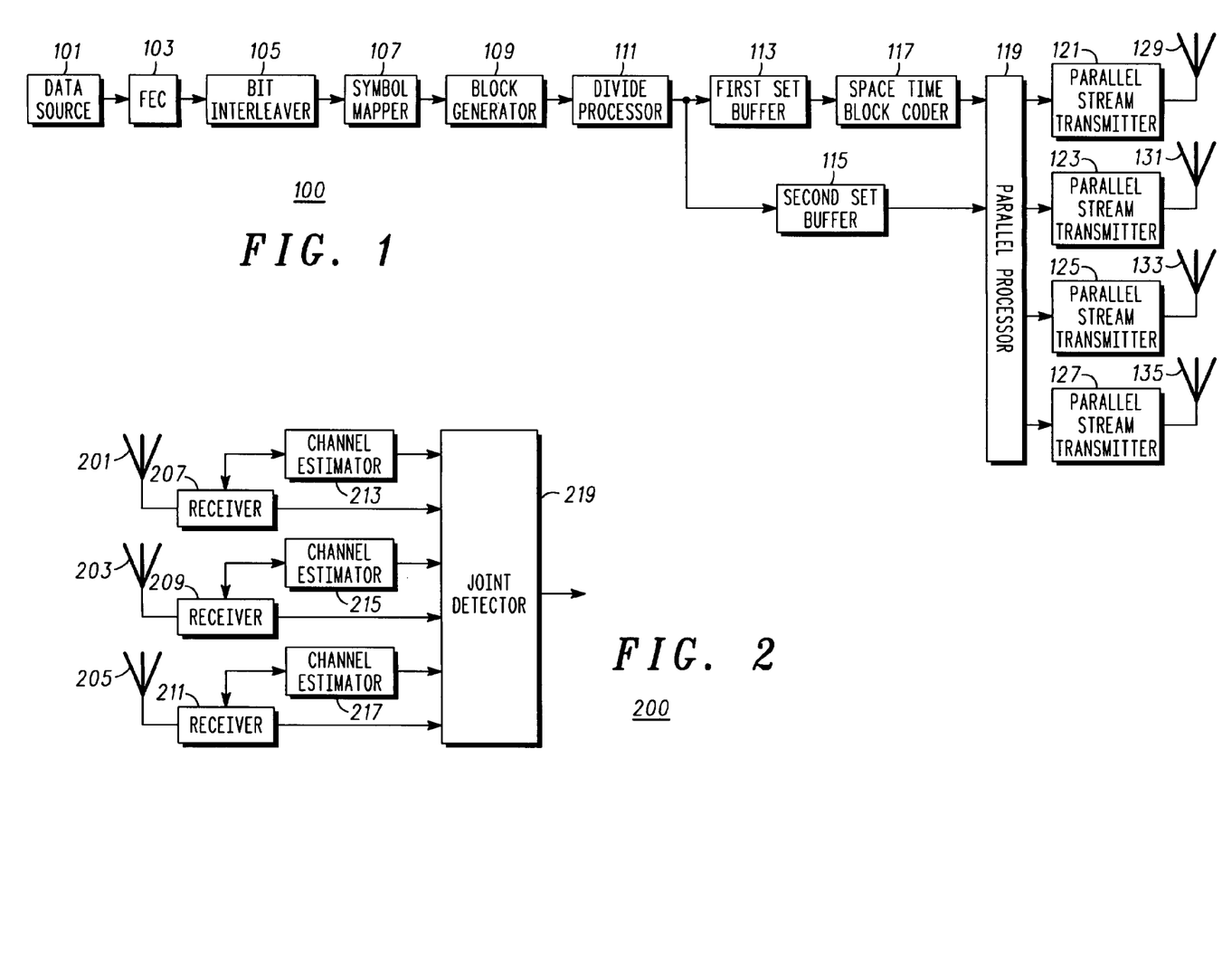
FIG. 1 illustrates a wireless data transmitter in accordance with an embodiment of the invention.
FIG. 2 illustrates a receiver in accordance with an embodiment of the invention.

FIG. 1 illustrates a wireless data transmitter 100 in accordance with an embodiment of the invention.

In the example, a data source 101 provides a binary data stream which is to be transmitted. The data source 101 may be an internal or external source. Furthermore, the binary data stream may be derived in any suitable way and may represent any suitable data. For example, the data source may be part of an access point for a Wireless Local Area Network (WLAN) and the binary data stream may be part of a data packet that is to be transmitted by the access point.

In the embodiment of FIG. 1, the data source 101 is coupled to a Forward Error correction Code (FEC) encoder 103 that provides a binary encoding in accordance with a selected FEC. In particular, the FEC encoder 103 may be a convolutional encoder. The FEC encoder 103 is fed the binary data stream from the data source 101 and generates an encoded binary data stream.

The FEC encoder 103 is coupled to a bit interleaver 105 that in the embodiment of FIG. 1 performs bit interleaving in the time domain. The bit interleaving in the specific embodiment is performed over blocks comprising several hundred data bits thereby providing an improved sensitivity to temporary fading, noise or interference in the communication channel. The bit interleaver 105 is thus fed the encoded binary data stream and in response generates an interleaved encoded binary data stream.

It will be appreciated that in other embodiments, other interleaving may be performed or interleaving may be omitted.

The bit interleaver 105 is coupled to a symbol mapper 107 that maps the data bits of the interleaved encoded binary data stream to data symbols to be transmitted over the communication channel. Thus, the symbol mapper 107 generates a data symbol stream from the interleaved encoded binary data stream.

The symbol mapping used depends on the transmission scheme used in the communication system. For example, a simple QAM (Quadrature Amplitude Modulation) transmission scheme may be used wherein a number of data bits are mapped to a corresponding QAM symbol selected appropriately from the possible symbol constellation points of the modulation scheme. E.g. if Quaternary Phase Shift Keying (QPSK) is used, pairs of data bits are mapped to the appropriate complex data symbol.

Hence, the output of the symbol mapper 107 in the embodiment of FIG. 1 is a data symbol stream of complex data symbols. It will be appreciated that in other embodiments, a data symbol stream may comprise other types of data symbols. It will furthermore be appreciated that the data symbol stream may be determined in other ways and may e.g. be derived using other operations or another order of the operations. For example, interleaving may be formed directly on the data symbols, i.e. after the binary data streams have been mapped to appropriate data symbols. In other embodiments, the data source may directly generate data symbols that are directly suitable for transmission over the communication channel.

The symbol mapper 107 is coupled to a block generator 109 and the data symbol stream is fed from the symbol mapper 107 to the block generator 109. The block generator 109 is operable to divide the data symbol stream into data symbol blocks. In the embodiment of FIG. 1, the block generator 109 simply divides the data symbol stream into data symbol blocks of a fixed size by sequentially selecting a fixed number of consecutive data symbols. As a specific example, the block generator 109 may generate symbol data blocks each comprising eight consecutive data symbols.

The block generator 109 is coupled to a divide processor 111. The divide processor 111 processes each block individually and is operable to divide each of the data symbol blocks into a first set and a second set. The divide processor 111 is coupled to a first set buffer 113 that is operable to store data symbols that have been assigned to the first set. The divide processor 111 is furthermore coupled to a second set buffer 115 that is operable to store data symbols that have been assigned to the second set.

In the embodiment, the divide processor 111 divides the data symbol blocks by assigning the data symbols of the current data symbol block to the first or second set in accordance with a suitable selection criterion. As a simple example for the situation where each data symbol block comprises eight data symbols, the divide processor 111 may simply assign the first four data symbols of the data symbol block to the first data set and the last four data symbols of the data symbol block to the second data set. Hence, in this embodiment, the first and second sets both comprise the same number of data symbols. The divide processor 111 is operable to store the data symbols of the first set in the first set buffer 113 and the data symbols of the second set in the second set buffer 115.

The first set buffer 113 is coupled to a space time block coder 117 which is operable to apply a space time block coding of the data symbols of the first set. In the embodiment of FIG. 1, the space time block coder 117 performs an Alamouti coding of the data symbols of the first set thereby generating a coded set comprising the data symbols resulting from the Alamouti coding. In the specific example, the four data symbols of the first set are Alamouti coded to generate eight coded data symbols.

The space time block coder 117 and the second set buffer 115 are coupled to a parallel processor 119 which is operable to create a plurality of parallel data streams from the coded set and the second set. The parallel processor 119 is coupled to a plurality of parallel stream transmitters 121-127 that in the embodiment of FIG. 1 consists of four parallel stream transmitters 121-127. Each of the parallel stream transmitters 121-127 is coupled to an antenna 129-135 and is arranged to transmit the data symbols of the corresponding parallel data stream on the antenna 129-135 to which it is connected. Thus, each of the parallel data streams is allocated to one of the plurality of antennas 129-135.

The parallel stream transmitters 121-127 are operable to transmit the data symbols of the parallel data streams in parallel. Thus, while a data symbol is transmitted on a given frequency by a first of the parallel stream transmitters 121-127, another data symbol is transmitted on the same frequency by a second of the parallel stream transmitters 121-127. Furthermore, in CDMA communication systems wherein code separation between communication channels is used, the parallel stream transmitters 121-127 all use the same spreading and scrambling codes. In the embodiment of FIG. 1, the transmitted data symbols are substantially aligned such that the transmitted data symbols on each antenna 129-135 start and finish at substantially the same times. In this embodiment, a parallel data symbol is effectively transmitted from the transmitter 100 during each symbol time, each parallel data symbol comprising the data symbols transmitted on each individual antenna in that symbol time.

The parallel processor 119 not only assigns data symbols from the second set and the coded data set to the parallel data streams corresponding to the antennas but also orders the data symbols of each parallel data stream. Hence, the parallel processor 119 ensures that all data symbols of the encoded set and the second set are transmitted on at least one of the transmit antennas 129-135. In the embodiment, the parallel processor 119 assigns each of the data symbols of the coded set and the second set to an individual antenna and transmission time by creating a number of parallel data symbols. For example, for the specific example of a data symbol block comprising eight data symbols, the four data symbols of the first set and the eight data symbols of the coded set are arranged into three parallel data symbols each comprising four data symbols corresponding to one data symbol for each antenna. The data symbol block is thus transmitted as three parallel data symbols in three symbol times resulting in an effective data rate of 8/3.

A specific example of the processing of a data block will be described in more detail. In the example, the block generator 109 generates a data symbol block comprising the eight data symbol values $(S_1, S_2, S_3, S_4, S_5, S_6, S_7, S_8)$. The data symbol block is fed to the divide processor 111, which in the specific example simply assigns the first four data symbols to the first set and the last four data symbols to the second set. Hence, the first set may consist in $(S_1, S_2, S_3, S_4)$ and the second set may consist in $(S_5, S_6, S_7, S_8)$. The first set is fed to the space time block coder 117 which performs an Alamouti coding on the data of the first set. Specifically, the space time block coder 117 orders the data symbols of the first set into two pairs $(S_1, S_2)$ and $(S_3, S_4)$ and for each pair generates the Alamouti coded data symbols $(S_1, S_2, -S_2^*, S_1^*)$ and $(S_3, S_4, -S_4^*, S_3^*)$ where * denotes the complex conjugate. Hence, the coded set comprises the coded data symbols $(S_1, S_2, -S_2^*, S_1^*, S_3, S_4, -S_4^*, S_3^*)$ It can be noted that for a standard Alamouti coding, some of the coded data symbols are identical to the original data symbols, or in other words that the Alamouti encoding described simply adds additional coded symbols to the first set.

The parallel processor 119 then proceeds to assign the data symbols of the coded set and the second set to the parallel data streams corresponding to the individual antennas. The allocation is such that the Alamouti encoding is achieved and in particular the four coded data symbols of each pair of data symbols being coded are transmitted on two antennas in two data symbol times.

In the specific example, the parallel processor 119 transmits the twelve data symbols on the four antennas in three symbol times. In the specific example the parallel processor 119 generates a first parallel data symbol comprising the values $(S_1, S_2, S_5, S_6)$. Hence, in the first data symbol time, the first antenna 129 transmits $S_1$, the second antenna 131 transmits $S_2$, the third antenna 133 transmits $S_5$ and the fourth antenna 135 transmits $S_6$. Hence, the parallel data symbol in this case comprises both data from the coded set and data from the second set.

In the specific example the parallel processor 119 generates a second parallel data symbol comprising the values $(-S_2^*, S_1^*, -S_4^*, S_3^*)$. Hence, in the second data symbol time, the first antenna 129 transmits $-S_2^*$, the second antenna 131 transmits $S_1^*$, the third antenna 133 transmits $-S_4^*$ and the fourth antenna 135 transmits $S_3^*$. Hence, the parallel data symbol in this case comprises only data from the coded set albeit from two different Alamouti encoded pairs. Furthermore, the transmission of the second parallel data symbol can be seen to accomplish the transmission of the Alamouti coding of $S_1$ and $S_2$. In the specific example, the parallel processor 119 furthermore generates a third parallel data symbol comprising the values $(S_7, S_8, S_3, S_4)$. Hence, in the third data symbol time, the first antenna 129 transmits $S_7$, the second antenna 131 transmits $S_8$, the third antenna 133 transmits $S_3$ and the fourth antenna 135 transmits $S_4$. Hence, the parallel data symbol in this case comprises the remaining data symbols thereby completing the Alamouti coding of data symbols $S_3$ and $S_4$ and finalising the transmission of the data symbols of the second set.

Thus, in this example the parallel data streams comprise the data symbols given by:

$$\begin{vmatrix} S_7 & -S_2^* & S_1 \\ S_8 & S_1^* & S_2 \\ S_3 & -S_4^* & S_5 \\ S_4 & S_3^* & S_6 \end{vmatrix}$$

wherein each row represents a parallel data stream associated with one antenna, each column represents a transmit symbol time and * denotes complex conjugation. In this representation, each column thus corresponds to a parallel data symbol transmitted by the transmitter 100 in a given symbol time interval.

It will be appreciated that the denotation of the data symbols is not intended to reflect a specific order or sequence of the data symbols, and that in particular the index numbering does not necessarily imply an order or sequence of the data symbols in the data symbol blocks.

Also, it will be appreciated that permutations, sign inversions or complex conjugations of symbols can lead to new code tables that are equivalent to the ones presented here.

FIG. 2 illustrates a receiver in accordance with an embodiment of the invention.

The receiver 200 comprises a number of antennas, which in the example is three antennas. Each of the three antennas 201, 203, 205 is connected to a receiver 207, 209, 211 which is operable to generate received symbols for each symbol time by amplifying, filtering and demodulating the received signal as is well known in the art. Hence, each of the receivers 207, 209, 211 generates a received symbol sample, $y_i$, for each symbol time. In the ideal case, each receiver 207, 209, 211 generates a symbol sample given by:

$$y = h_a \cdot S_a + h_b \cdot S_b + h_c \cdot S_c + h_d \cdot S_d$$

where $S_a, S_b, S_c$ and $S_d$ represents the data symbol transmitted from each of the four antennas in the symbol time interval and $h_a, h_b, h_c$, and $h_d$ represents the sub-channel response from the sub-communication channel between the corresponding transmit antenna and the receive antenna connected to the receiver.

Each of the receivers 207, 209, 211 is coupled to a channel estimator 213, 215, 217 which is operable to estimate the channel response from each of the transmit antennas to the receive antenna of the receiver to which the channel estimator is coupled.

The receivers 207, 209, 211 and the channel estimators 213, 215, 217 are coupled to a joint detector 219. The joint detector 219 receives the symbol samples from the receivers 207, 209, 211 and the channel estimates from the channel estimators 213, 215, 217 and in response determines the received data symbols by joint detection.

In the specific example described above with four transmit antennas and eight data symbols in a symbol data block, each receiver will substantially receive the following three data symbols $y_i$ in the three symbol times used to transmit the data symbol block:

$$\begin{bmatrix} y_1 \\ y_2 \\ y_3 \end{bmatrix} = \begin{bmatrix} s_1 & s_2 & s_5 & s_6 \\ -s_2^* & s_1^* & -s_4^* & s_3^* \\ s_7 & s_8 & s_3 & s_4 \end{bmatrix} \begin{bmatrix} h_a \\ h_b \\ h_c \\ h_d \end{bmatrix} + \begin{bmatrix} n_1 \\ n_2 \\ n_3 \end{bmatrix}$$

where it is assumed that the channel response is static during the three data symbol times and that the noise of the individual sub-channels and between symbol times is uncorrelated. In the equation, $n_i$ represents the combined sub-communication channel additive noise and interference during the $i^{th}$ symbol time.

This equation can be rewritten as follows:

$$\begin{bmatrix} y_1 \\ y_2^* \\ y_3 \end{bmatrix} = \underbrace{\begin{bmatrix} h_a & h_b & 0 & 0 & h_c & h_d & 0 & 0 \\ h_b^* & -h_a^* & h_d^* & -h_c^* & 0 & 0 & 0 & 0 \\ 0 & 0 & h_c & h_d & 0 & 0 & h_a & h_b \end{bmatrix}}_{H} \begin{bmatrix} s_1 \\ s_2 \\ s_3 \\ s_4 \\ s_5 \\ s_6 \\ s_7 \end{bmatrix} + \begin{bmatrix} n_1 \\ n_2^* \\ n_3 \end{bmatrix}.$$

wherein the equivalent channel matrix H is used. The equivalent channel matrix reflects an estimated correspondence between the data symbols of the data symbol block and the received signal for each receiver in each symbol time interval. Thus the equivalent channel matrix comprises a sub-channel estimate in positions corresponding to a data symbol and a symbol time in which the data symbol is transmitted. The sub-channel estimate is that of the sub-channel from the transmit antenna on which the data symbol was transmitted to the receive antenna of the receiver. It will be appreciated that the sub-channel estimate may be complex conjugated and sign inverted in order to facilitate the receive operations. The equivalent channel matrix furthermore comprises a zero in positions corresponding to a data symbol and symbol time in which the data symbol is not transmitted.

The joint detector 219 is fed the received symbol samples and the sub-channel estimates h. In response, it determines the received symbol data S.

Specifically, the joint detector may determine the detection matrix G for the equivalent channel matrix H using for example a Zero-Forcing (ZF) or Minimum Mean Square Error (MMSE) algorithm as is well known in the art. For example, and for ZF algorithm, the detection matrix G is computed as $$G = (H^H H)^{-1} H^H$$

to compensate for the contribution of the channel in the received signals, where the operator $H^H$ represents the transpose complex conjugate of the equivalent channel matrix H.

The received symbol data may then be determined as:

$$\begin{bmatrix} \hat{s}_1 \\ \hat{s}_2 \\ \hat{s}_3 \\ \hat{s}_4 \\ \hat{s}_5 \\ \hat{s}_6 \\ \hat{s}_7 \\ \hat{s}_8 \end{bmatrix} = G \begin{bmatrix} y_1 \\ y_2^* \\ y_3 \end{bmatrix}$$

It will be appreciated that the above description is readily extended to a plurality of receive antennas and receivers. In particular, for a receiver using M antennas, the values of $y_i$ and $n_i$ in the above equations will denote the M×1 vectors corresponding to the received signal vector and the additive noise component at each antenna, $h_m$ will denote the M×1 vector of the channel coefficients between a transmit antenna and the receive antennas and a 0 will denote a M×1 vector of 0s.

As can be seen from the above description, the transmitted signals can in principle be received by a single receive antenna. However, improved performance may be achieved by using a plurality of receive antennas. However, the described approach is suitable for a relatively low number of receive antennas and in particular the receiver may comprise fewer receive antennas than transmit antennas.

In the specific example described above, the overall operation of the block processing was represented by the code table given by:

$$\begin{vmatrix} S_7 & -S_2^* & S_1 \\ S_8 & S_1^* & S_2 \\ S_3 & -S_4^* & S_5 \\ S_4 & S_3^* & S_6 \end{vmatrix}$$

wherein each row represents a parallel data stream associated with one antenna and each column represents a parallel data symbol and * denotes complex conjugation.

It is noted that this code table provides for a high correlation between the parallel data symbols thereby allowing for an efficient and high performance communication.

In particular, the code table results in the rank of the equivalent channel matrix being higher than the number of data symbols in the data symbol blocks when the receiver comprises three or more antennas. This allows all data symbols to be determined in accordance with the described approach.

The code table in particular provides for a correlation between parallel data symbols by consecutive parallel data symbols within the data symbol block each comprising at least one data symbol resulting from space time block coding of a common data symbol. For example, the Alamouti coding of $S_1$, and $S_2$ results in data symbols which are comprised in the first and second parallel data symbol, and the Alamouti coding of $S_3$, and $S_4$ results in data symbols which are comprised in the second and third parallel data symbol.

In the example, the number of data symbols in the first set is equal to the number of data symbols in the second set. This provides for a reasonable compromise between the data rate and the improvement due to spatial diversity.

In the example, it can furthermore be seen that the first and third parallel data symbols comprise data symbols taken both from the coded set and the second set. This allows for a correlation between the first coded data set and the second data set that facilitates receiving the signal. Furthermore, it can be seen that the second parallel data symbol comprises only data symbols from the coded set thereby allowing a flexible allocation.

As can be seen in the specific example, the association between the parallel data streams and the coded set and the second set varies for different parallel data symbols. In particular, the first parallel data stream (of antenna 129) is varied from being associated with the coded set in the first and second parallel data symbol to being associated with the second set in the third parallel data symbol.

Thus, in some embodiments, the coded set is not just transmitted from the same antennas but is shifted between different antennas. Similarly, the uncoded data symbols are not all transmitted from the same antenna but are transmitted from different antennas. Thus, spatial interleaving is introduced wherein the Alamouti coded data and the non-Alamouti coded data experience an increased variety of channel conditions. This spatial interleaving may be advantageous in many embodiments and may in particular achieve an improved average error performance. For example, the benefit of the Alamouti coding is dependent on the channel characteristics and varying the sub-channels used for the Alamouti coded data may reduce the risk of the Alamouti data being transmitted over sub-channels for which low benefit is achieved. The benefit is particularly advantageous in embodiments also using FEC coding of the data.

It will be appreciated that although the described code table provides advantageous properties for many embodiments, other code tables, possibly sharing one or more of these advantageous characteristics, may be implemented in other embodiments.

For example, it will be appreciated that permutations, sign inversions or complex conjugations of symbols can lead to new code tables that are equivalent to the ones presented here. In particular for the rate 8/3 code table presented above, equivalent code tables providing a high correlation between the parallel data symbols preferably have at least one symbol of a coded set in each parallel data symbol and in each parallel data stream.

Another example of code that may be used includes the following:

$$\begin{vmatrix} -S_2^* & S_7 & S_1 \\ S_1^* & S_8 & S_2 \\ -S_4^* & S_3 & S_5 \\ S_3^* & S_4 & S_6 \end{vmatrix}$$

The previous description has focussed on an embodiment using four transmit antennas. However, it will be appreciated that the invention is also applicable to other numbers of transmit antennas. For example, the approach may be used with three transmitters.

In some such embodiments, each data symbol block may contain four data symbols. The four data symbols may be equally divided such that the first and second set each contains two data symbols. The two data symbols of the second set may be Alamouti coded to generate four coded data symbols in the coded set. The resulting six data symbols may be transmitted using two parallel data symbols each comprising three data symbols corresponding to the three transmit antennas. Hence, an efficient transmission rate of four data symbols in two symbol times can be achieved.

As a specific example, the block processing of a symbol data block comprising the four data symbols bits $S_1, S_2, S_3, S_4$ may be represented by the code table given by:

$$\begin{vmatrix} -S_2^* & S_1 \\ S_1^* & S_2 \\ S_4^* & S_3 \end{vmatrix}$$

wherein each row represents a parallel data stream associated with one antenna and each column represents a parallel data symbol transmitted in a transmit symbol time and * denotes complex conjugation.

In this example, each of the parallel data symbols is thus created by selecting two data symbols from the coded set and one data symbol from the second set.

The shown code table block allows for an efficient communication of the data symbols and in particular allows for reception using an equivalent channel matrix having a rank which is higher than four, when the receiver comprises at least two antennas, thereby allowing all four data symbols to be derived by calculating the detection matrix from the equivalent channel matrix.

However, it will be appreciated that although the described code table provides advantageous properties for many embodiments, other code tables, possibly sharing one or more of these advantageous characteristics, may be implemented in other embodiments.

It will be appreciated that permutations, sign inversions or complex conjugations of symbols can lead to new code tables that are equivalent to the ones presented here.

In particular for the rate 2 code table presented above, equivalent code tables providing a high correlation between the parallel data symbols preferably include the Alamouti coding of two symbols.

Another example of code that may be used includes the following:

$$\begin{vmatrix} -S_2^* & S_1 \\ S_4 & S_3 \\ S_1^* & S_2 \end{vmatrix}$$

In the embodiment of FIG. 1, a single data symbol stream originating from a single FEC encoder was transmitted using a plurality of antennas. However, in other embodiments, data symbol streams associated with a plurality of FEC encoders may be transmitted.

For example, the apparatus may comprise a first FEC encoder which applies a first forward error correcting code to a first data stream to generate a first encoded data stream and second FEC encoder which applies a second forward error correcting code to a second data stream to generate a second encoded data stream. Each of the first encoded data stream and the second encoded data stream may furthermore be interleaved.

The first and second data streams are then combined to generate the data symbol stream to be transmitted. As a specific example, the combination may simply be achieved by alternating between four data symbols from the first encoded data stream and four data symbols from the second encoded data stream.

The block generator may in this case generate data symbol blocks which comprise data symbols from both the first and second encoded data stream. For example, the first four data symbols of the data symbol blocks may consist in four data symbols from the first encoded data stream followed by four data symbols from the second encoded data stream.

In such embodiments, the first set preferably comprises data symbols from both the first encoded data stream and the second encoded data stream. Accordingly, data symbols from both the first and second encoded data stream are preferably Alamouti encoded. Similarly, data symbols from both the first and second encoded data stream are preferably transmitted without Alamouti encoding. As the Alamouti encoding provides an improved reliability of the reception of the data symbols, this will spread the benefit of the Alamouti coding to both encoded data streams thereby providing for an increased diversity. Hence, an improved average error rate may be achieved.

The allocation of data symbols to the first and second set in order to allocate data symbols from both FEC encoders may be achieved in different ways. For example, the criterion used by the divide processor 111 may be selected to take into account characteristics of the way the data symbol stream is generated. For example, if the first four data symbol blocks comprise data symbols from the first encoded data stream and the last four data symbol blocks comprise data symbols from the second encoded data stream, the divide processor 111 may select the first, second, fifth and sixth symbol for Alamouti encoding.

Another possibility is for the divide processor 111 to divide each of the data symbol blocks into the first and second set in accordance with a criterion that varies from one data block to the next. For example, in a first data symbol block, the divide processor 111 may select the first four data symbols for Alamouti encoding and in the next data symbol block the divide processor may select the last four data symbols and so on.

It will furthermore be appreciated that such a varying criterion may not only be beneficial when a plurality of FEC encoders are used but may also be advantageous and provide additional diversity in other embodiments. In particular, in embodiments wherein there is a correlation between the ordered data bits in consecutive data symbol blocks, a varying allocation criterion may improve the diversity and thus improve communication performance.

The invention can be implemented in any suitable form including hardware, software, firmware or any combination of these. For example, the invention may partly be implemented as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with the preferred embodiment, it is not intended to be limited to the specific form set forth herein. Rather, the scope of the present invention is limited only by the accompanying claims. In the claims, the term comprising does not exclude the presence of other elements or steps. Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. In addition, singular references do not exclude a plurality. Thus references to "a", "an", "first", "second" etc do not preclude a plurality.

The invention claimed is:

1. An apparatus for transmitting a data stream over a communication channel, the apparatus comprising:
a plurality of transmit antennas;
means for dividing data into a first set of data and a second set of data wherein the data comprises eight data symbols $S_1, S_2, S_3, S_4, S_5, S_6, S_7, S_8$,
means for coding the first set in accordance with a space time block code to generate a coded set of data;
means for creating a plurality of parallel data streams from the coded set and the second set, each parallel data stream being allocated to one of the plurality of antennas and the parallel data streams comprise the data symbols substantially given by:

$$\begin{vmatrix} S_7 & -S_2^* & S_1 \\ S_8 & S_1^* & S_2 \\ S_3 & -S_4^* & S_5 \\ S_4 & S_3^* & S_6 \end{vmatrix}$$

wherein each row represents a parallel data stream associated with one antenna and each column represents a transmit symbol time and * denotes complex conjugation; and
means for transmitting the data in the communication channel by transmitting the parallel data streams in parallel from the plurality of transmit antennas.

2. An apparatus as claimed in claim 1 wherein the means for creating the plurality of parallel data streams is operable to divide the data of the coded set and the second set into a plurality of parallel data, each parallel data comprising one data for each parallel data stream.

3. An apparatus as claimed in claim 2 wherein the means for varying is operable to vary a first parallel data stream from being associated with the coded set in a first parallel data to being associated with the second set in a second parallel data.

4. An apparatus as claimed in claim 2 wherein at least one parallel data comprises only data from the coded set.

5. An apparatus as claimed in claim 2 wherein at least one parallel data comprises data from both the coded set and the second set.

6. An apparatus as claimed in claim 2 wherein each of the parallel data is created by selecting a first number of data from the coded set and a second number of data from the second set.

7. An apparatus as claimed in claim 2 wherein consecutive parallel data within the data each comprise at least one data resulting from space time block coding of a common data.

8. An apparatus as claimed in claim 1 further comprising means for varying the association between the parallel data streams and the coded set and the second set for different parallel data.

9. An apparatus as claimed in claim 1 wherein data contains eight data symbols, the first set contains four data symbols, the coded set contains eight data symbols, the second set contains four data symbols and the plurality of antennas is four antennas.

10. An apparatus as claimed in claim 1 further comprising:
means for applying a forward error correcting code to a data stream to generate a first encoded data stream; and
means for generating the data stream by mapping the first coded data stream to a data constellation.

11. An apparatus as claimed in claim 1 further comprising:
means for applying a first forward error correcting code to a first data stream to generate a first encoded data stream;
means for applying a second forward error correcting code to a second data stream to generate a second encoded data stream; and
means for generating the data stream by including the first coded data stream and the second coded data stream.

12. An apparatus as claimed in claim 1 wherein the means for dividing data into the first set is operable to divide data into the first set of data and the second set of data in accordance with a varying criterion.

13. An apparatus as claimed in claim 1 wherein a number of data in the first set is equal to the number of data in the second set.

14. An apparatus as claimed in claim 1 further comprising:
receiving means for receiving the transmitted data; and
means for, for each data, determining the data by joint detection of the parallel data streams.

15. An apparatus as claimed in claim 14 wherein the receiving means is operable to determine an equivalent channel matrix for each receive antenna and to determine the block data in response to the equivalent channel matrix and the received data.

16. An apparatus as claimed in claim 15 wherein the means for creating a plurality of parallel data streams is operable to allocate data of the first set and the coded data set to the parallel data streams such that a rank of the equivalent channel matrix is higher than or equal to a number of data in the data.

17. An apparatus as claimed in claim 14 wherein the receiving means comprises fewer receive antennas than the plurality of transmit antennas.

18. An apparatus for receiving a data stream; the apparatus comprising:
means for receiving a signal over a communication channel, the signal comprising a plurality of data wherein the data comprises eight data symbols $S_1, S_2, S_3, S_4, S_5, S_6, S_7, S_8$, each data comprising a plurality of parallel data streams, each parallel data stream being transmitted from a separate antenna, the parallel data streams comprising space time block coded data and non space time block coded data and the parallel data streams comprise the data symbols substantially given by:

$$\begin{vmatrix} S_7 & -S_2^* & S_1 \\ S_8 & S_1^* & S_2 \\ S_3 & -S_4^* & S_5 \\ S_4 & S_3^* & S_6 \end{vmatrix}$$

wherein each row represents a parallel data stream associated with one antenna and each column represents a transmit symbol time and * denotes complex conjugation; and
means for generating the data stream by joint detection of the parallel data streams.

19. A method of transmitting a data stream over a communication channel from a plurality of transmit antennas; the method comprising the steps of:
dividing the data stream into data wherein the data comprises eight data symbols $S_1, S_2, S_3, S_4, S_5, S_6, S_7, S_8$;
dividing each of the data into a first set of data and a second set of data;
coding the first set in accordance with a space time block code to generate a coded set of data;

creating a plurality of parallel data streams from the coded set and the second set, each parallel data stream being allocated to one of the plurality of antennas and the parallel data streams comprise the data symbols substantially given by:

$$\begin{vmatrix} S_7 & -S_2^* & S_1 \\ S_8 & S_1^* & S_2 \\ S_3 & -S_4^* & S_5 \\ S_4 & S_3^* & S_6 \end{vmatrix}$$

wherein each row represents a parallel data stream associated with one antenna and each column represents a transmit symbol time and * denotes complex conjugation; and transmitting the data in the communication channel by transmitting the parallel data streams in parallel from the plurality of transmit antennas.

* * * * *